United States Patent

Maness

Patent Number: 5,394,908
Date of Patent: Mar. 7, 1995

[54] APPARATUS AND METHOD FOR FILLING A CONTAINER

[75] Inventor: James E. Maness, Tulsa, Okla.

[73] Assignee: TRW Vehicle Safety Systems Inc., Lyndhurst, Ohio

[21] Appl. No.: 166,242

[22] Filed: Dec. 13, 1993

[51] Int. Cl.⁶ .............................................. B65B 31/10
[52] U.S. Cl. .................................. 141/1; 141/4; 141/18; 141/346; 141/9; 141/392; 277/236; 285/917
[58] Field of Search ................. 277/236; 141/9, 1, 4, 141/18, 346, 368, 311 R, 392; 285/917

[56] References Cited

U.S. PATENT DOCUMENTS

| | | | |
|---|---|---|---|
| 2,381,454 | 8/1945 | Huth | 141/368 X |
| 3,191,685 | 7/1964 | Watts | 285/917 X |
| 3,907,013 | 9/1975 | Harvey | 141/392 |
| 4,611,641 | 9/1986 | Carter, Sr. | 141/4 |
| 4,860,803 | 8/1989 | Wells | 141/9 |
| 4,917,156 | 4/1990 | Varlet | 141/346 X |
| 5,002,316 | 3/1991 | Chohan | 285/917 X |
| 5,129,657 | 7/1992 | McMarigal | 285/917 X |
| 5,163,715 | 11/1972 | Richard et al. | 285/917 X |

FOREIGN PATENT DOCUMENTS 4231356 4/1993 Germany.

*Primary Examiner*—Ernest G. Cusick
*Attorney, Agent, or Firm*—Tarolli, Sundheim & Covell

[57] ABSTRACT

A storage container (12) is filled with a combustible mixture of gases including a flammable gas and a primary gas which contains an oxidizer gas. A fill head (50) has a continuous annular ridge (130) which extends around a gas outlet (132) from the fill head. The ridge (130) indents the material of the storage container (12) around an opening (152) in the storage container through which a flow of gas is directed during filling of a chamber in the storage container to provide a gas tight seal between the ridge and the container.

14 Claims, 3 Drawing Sheets

APPARATUS AND METHOD FOR FILLING A CONTAINER

BACKGROUND OF THE INVENTION

The present invention relates to a new and improved method and apparatus for use in filling a container with gases and, more specifically, to a method and apparatus for filling a container with a combustible mixture of gases.

In U.S. patent application Ser. No. 947,147, filed Sep. 18, 1992 by Blumenthal et al. and entitled "Apparatus for Inflating a Vehicle Occupant Restraint", a source of inflation fluid for an air bag is a container which contains a combustible gas mixture. The combustible gas mixture includes a flammable fuel gas and an oxidizer gas.

During filling of the container with the combustible gas mixture, it is necessary to obtain a gas tight seal between a fill head and the container. When O-rings are used to provide the gas tight seal, the O-rings quickly fatigue and require replacement. In addition, when O-rings are used, the O-rings require a relatively large sealing area on the container.

SUMMARY OF THE INVENTION

The present invention provides a new and improved method and apparatus for use in filling a container with a mixture of gases, and particularly a combustible mixture of gases. During filling of the container, a gas tight seal is formed between a fill head and the container. The gas tight seal is formed by the fill head indenting the material of the container around a fill opening in the container. The material around the opening in the container is indented by a ridge on the fill head which extends around an outlet in the fill head.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENT

A gas storage container 12 (FIG. 1) is used in a vehicle occupant restraint system, such as an air bag system. Upon the occurrence of a high rate of vehicle deceleration which is indicative of a vehicle collision, a vehicle occupant restraint, such as an air bag, is inflated by gas from the storage container 12 to restrain movement of an occupant of the vehicle. The inflatable vehicle occupant restraint is inflated into a location in the vehicle between the occupant and certain parts of the vehicle, such as the steering wheel, instrument panel, door or the like. The inflated vehicle occupant restraint absorbs kinetic energy of the occupant's movement and restrains the occupant's movement so that the occupant does not forcibly strike parts of the vehicle.

The storage container 12 holds a combustible mixture of gases. The combustible mixture of gases held by the storage container 12 includes a primary gas, which comprises the majority of the gas for inflating the vehicle occupant restraint, and a flammable gas which, when ignited, heats the primary gas. The mixture of stored gases in the storage container 12 is in a homogeneous gaseous state. The primary gas preferably includes an oxidizer gas for supporting combustion of the flammable gas and an inert gas for inflating the vehicle occupant restraint. The primary gas may include air or an inert gas or a mixture of air and an inert gas. The inert gas may be nitrogen, argon or a mixture of nitrogen and argon. Preferably, the primary gas is air, and the oxidizer gas is the oxygen in the air. The flammable gas is hydrogen, methane or a mixture of hydrogen and methane. Preferably, the flammable gas is hydrogen. A typical composition of the mixture of gases in the storage container 12 is about 12% by volume hydrogen and 88% by volume air. The mixture of gases is stored in the storage container 12 at a pressure of approximately 2,500 psi. It should be recognized that other compositions and pressures are possible.

The manner in which the mixture of gases stored in the storage container 12 is used to inflate a vehicle occupant restraint is the same as is disclosed in the aforementioned U.S. patent application Ser. No. 947,147 filed Sep. 18, 1992 by Blumenthal et al. and entitled "Apparatus for Inflating a Vehicle Occupant Restraint". In the event of a vehicle collision, the container 12 is opened and the combustible mixture of gases is ignited. The mixture of gases is directed into the inflatable vehicle occupant restraint to inflate the vehicle occupant restraint.

Figure 1:
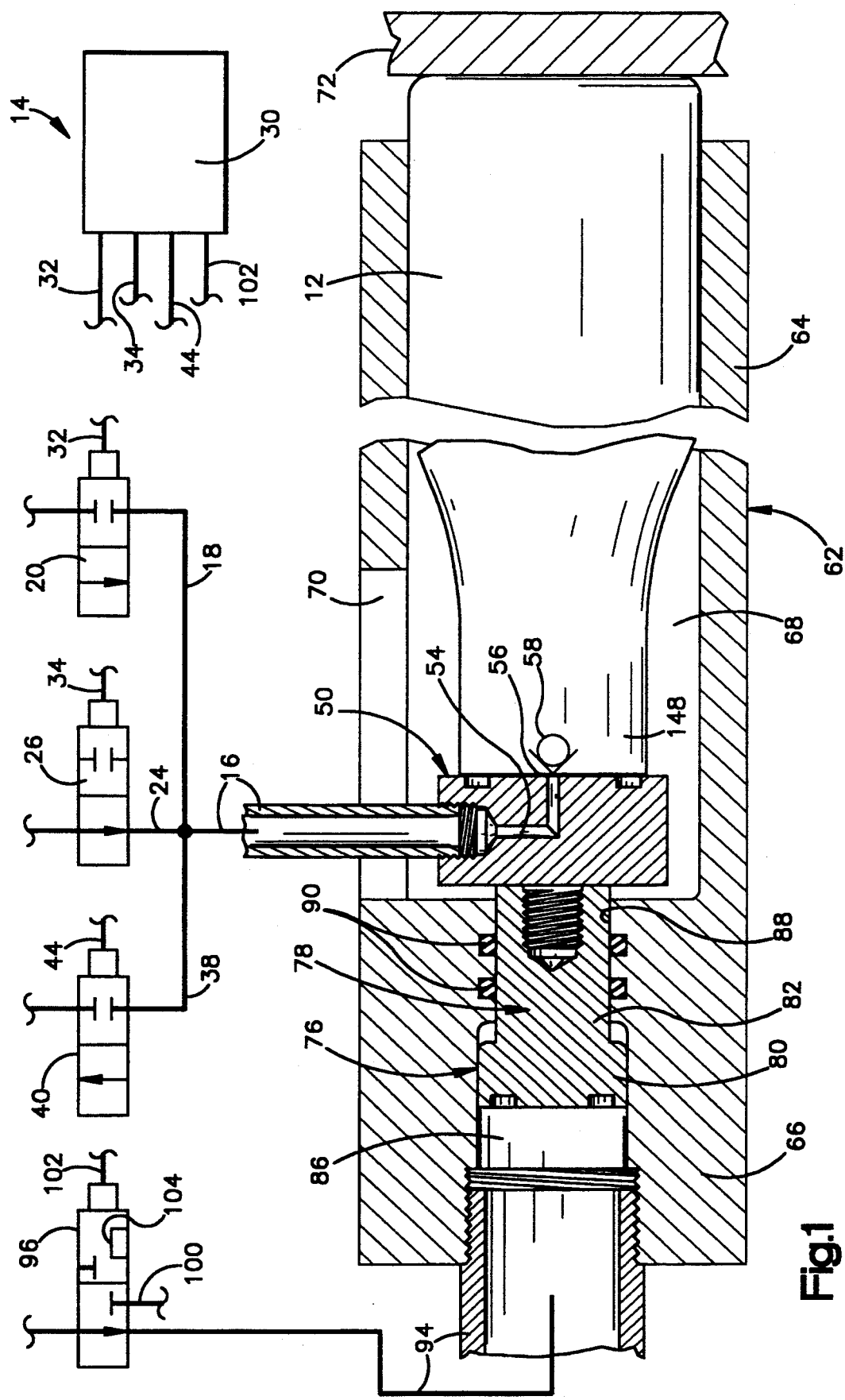
FIG. 1 is a schematic illustration of an apparatus which is constructed and operates in accordance with the present invention.

An apparatus 14 for filling a chamber in the storage container 12 with a combustible mixture of gases is illustrated schematically in FIG. 1. The apparatus 14 includes a fill conduit 16. The fill conduit 16 is connected with a conduit 18. The conduit 18 is connected with a source of primary gas, which is air, through a valve 20. The primary gas contains an oxidizer gas, which is the oxygen in the air. The valve 20 is operable between open and closed conditions to control the flow of the primary gas through the conduit 18 and the fill conduit 16.

The fill conduit 16 is also connected with a source of flammable gas, which is hydrogen, through a conduit 24 and valve 26. The valve 26 is operable between open and closed conditions to control the flow of combustible gas through the conduit 24 and the fill conduit 16. A controller 30 is connected with actuators for the valves 20 and 26 by leads 32 and 34, respectively, and controls operation of the valves and the flow of gas through the conduits 18 and 24 to the fill conduit 16.

The fill conduit 16 is further connected with a vacuum pump (not shown) through a conduit 38 and valve 40. The valve 40 is operable between open and closed conditions to control evacuation of the fill conduit 16. When the valve 40 is open and the valves 20 and 26 are closed, any flammable gas or primary gas in the conduits 16, 18 and 24 is conducted through the conduit 38 to the vacuum pump. The controller 30 is connected with an actuator for the valve 40 by a lead 44. The controller effects operation of the valve 40 from the closed condition to the open condition only after the valves 20 and 26 have been closed.

A one-piece fill head 50 (FIG. 1) is connected with the fill conduit 16. The fill head 50 is disposed in a holder 62, together with the storage container 12. The holder 62 includes a cylindrical side wall 64. The side wall 64 cooperates with an end section 66 of the holder 62 to form a cylindrical chamber 68 in which the fill head 50 and storage container 12 are disposed. The fill conduit 16 extends through a slot 70 formed in the cylindrical side wall 64 of the holder 62 so that the fill head 50 is located adjacent the end section 66 of the holder 62 between the end section 66 and the storage container 12. A retainer member 72 is disposed in abutting engagement with an end of the storage container 12 to hold the storage container in engagement with the fill head 50.

A piston and cylinder assembly 76 (FIG. 1) is disposed in the end section 66 of the holder 62. The piston and cylinder assembly 76 includes a piston 78 having a cylindrical piston head 80 and a cylindrical piston rod 82. The piston head 80 and piston rod 82 are formed as one piece and are disposed in a coaxial relationship.

The piston 78 is movable axially relative to the end section 66. The piston head 80 is slidably received in a cylindrical piston chamber 86 formed in the end section 66. The piston rod 82 extends through a cylindrical passage 88 formed in the end section 66. The passage 88 extends between the chamber 68, in which the storage container 12 is disposed, and the piston chamber 86. The cylindrical passage 88 is disposed in a coaxial relationship with the cylindrical piston chamber 86. A pair of annular seals 90 are disposed in the surfaces that define the passage 88 and engage and seal against the piston rod 82.

The piston chamber 86 is connected with a source of fluid pressure through a conduit 94 and a valve 96. The valve 96 is operable between an open condition connecting the conduit 94 with the source of fluid pressure and a closed condition venting the conduit 94 to atmosphere through a conduit 100. The controller 30 is connected with an actuator for the valve 96 by a lead 102.

Figure 2:
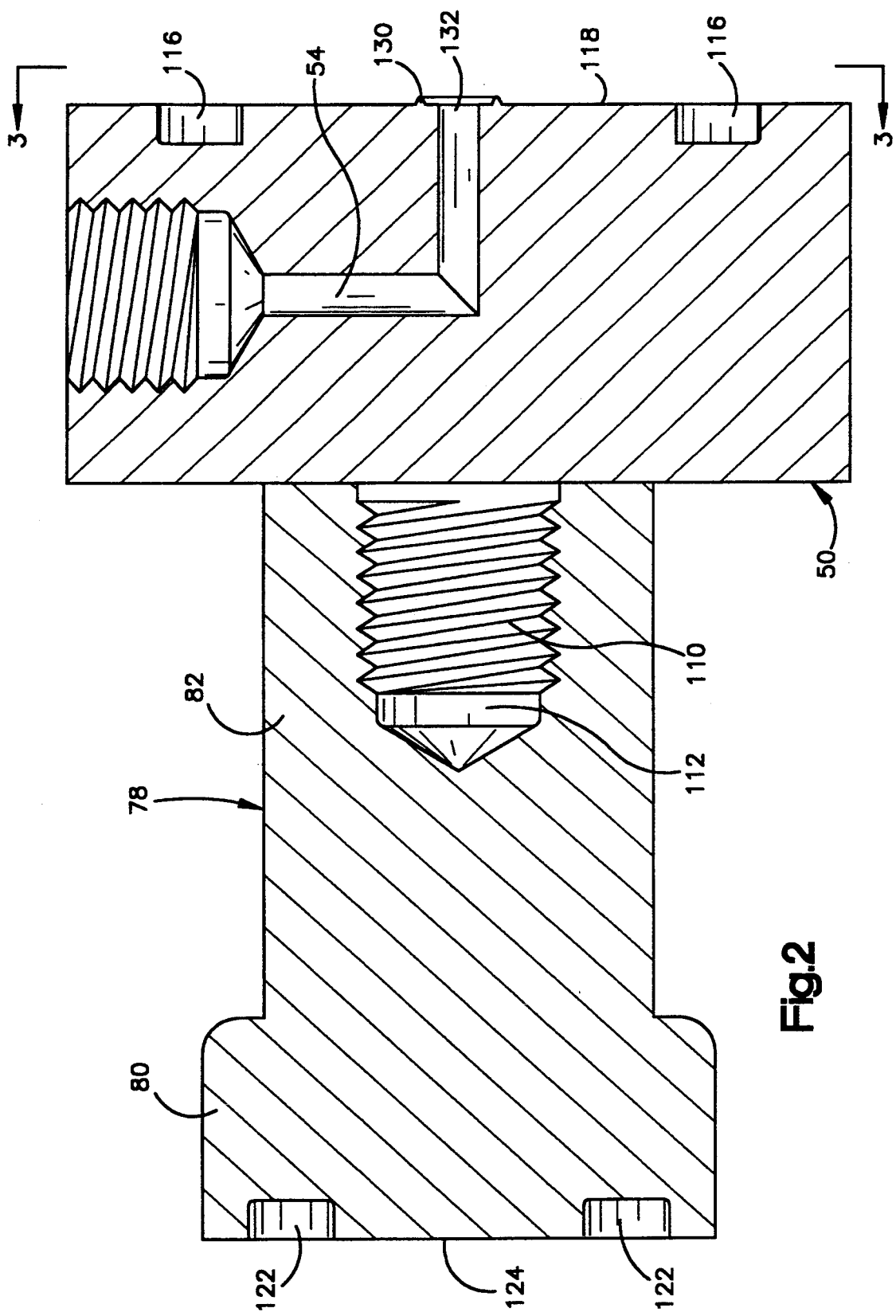
FIG. 2 is an enlarged illustration of a portion of the apparatus of FIG. 1.

An externally threaded projection 110 (FIG. 2) on the fill head 50 is received in an internally threaded opening 112 in the piston rod 82. The projection 110 is disposed in a coaxial relationship with the cylindrical fill head 50. The opening 112 is disposed in a coaxial relationship with the cylindrical piston rod 82. Therefore, the piston 78 and fill head 50 are fixedly interconnected, in a coaxial relationship, by the externally threaded projection 110 and the internally threaded opening 112. When the piston 78 and fill head 50 are fixedly interconnected in the end section 66 of the holder 62, in the manner illustrated in FIG. 1, the piston 78 and fill head 50 cannot be removed from the end section 66 of the holder 62 without disconnecting the fill head 50 from the piston.

Figure 3:
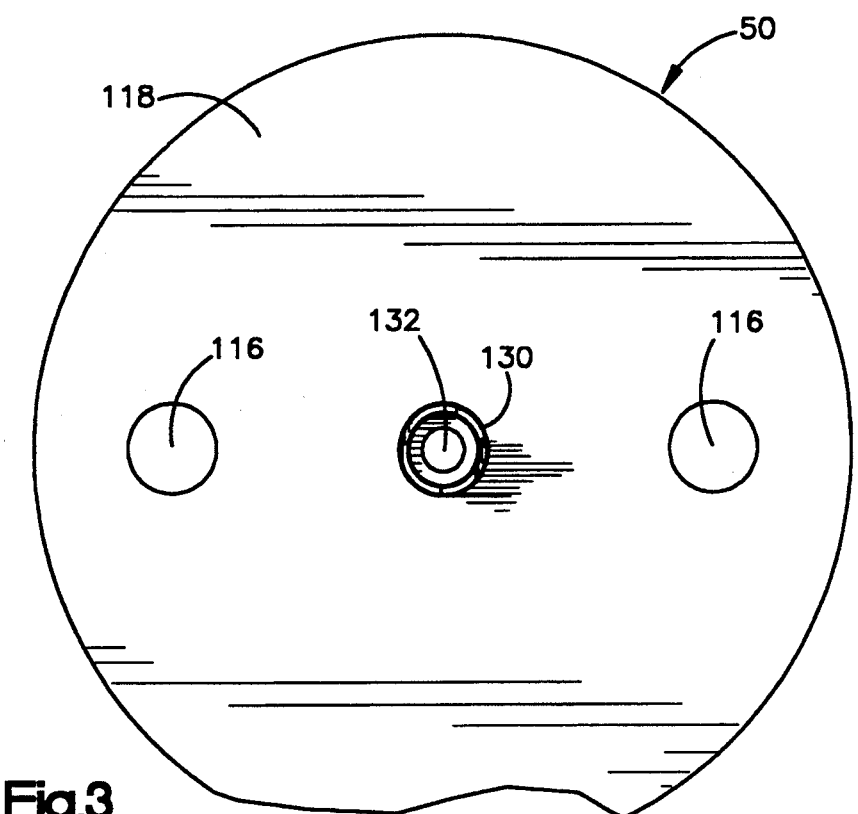
FIG. 3 is a view, taken along the line 3—3 of FIG. 2.

To facilitate interconnecting the piston 78 and fill head 50, cylindrical recesses 116 (FIGS. 2 and 3) are formed in a circular end face 118 of the fill head 50 opposite the projection 110. Similarly, a pair of cylindrical recesses 122 (FIG. 2) are formed in a circular end face 124 of the piston head 80 opposite the opening 112. The recesses 116 and 122 receive spanner wrenches to enable the fill head 50 to be screwed into and secured to the piston 78 when the piston and fill head are disposed in the holder 62 (FIG. 1).

A passage 54 extends into the fill head 50 from a side surface of the fill head. The passage 54 makes a right angle turn within the fill head and terminates in a circular outlet 132 disposed in the end face 118 of the fill head 50. A continuous seal ridge 130 (FIGS. 2, 3 and 4) is formed around the circular outlet 132. Gas flows into the passage 54 from the fill conduit 16 and out of the passage 54 through the outlet 132 during filling of the storage container 12 with gas.

The seal ridge 130 (FIG. 4) is formed in one piece with the metal fill head 50. The seal ridge 130 has opposed continuous annular side surfaces 140 and 142 which slope toward each other and terminate at a flat land 138. The land 138 extends in a complete circle around the outlet 132. The width of the land 138 between side surfaces 140 and 142 is about ten thousandths of an inch. From the land 138, the side surface 140 of the seal ridge 130 slopes radially outward. The side surface 142 slopes radially inward from the land 138. The angle formed between the side surfaces 140 and 142 may vary, but in the preferred embodiment is 45°. The side surface 142 of the seal ridge 130 is separated from the outlet 132 by an annular portion 144 of the circular end face 118 of the fill head 50.

The storage container 12 has a cylindrical metal end section 148 (FIG. 1) with a circular end face 154 which is engaged by the fill head 50. A passage 150 (FIG. 4) extends through the end section 148 to a chamber in the storage container 12. The passage 150 terminates at the end face 154 in a circular inlet 152 through which gas enters the passage 150 during filling of the storage container 12. A check valve 58 in the passage 150 prevents flow of gas from the storage container when the storage container is disconnected from the fill head 50.

The fill head 50 (FIG. 4) is formed of a metal, such as stainless steel. The end section 148 of the storage container 12 is formed of a metal, such as aluminum, having a hardness which is less than the hardness of the material of the fill head. Therefore, the relatively hard metal of the seal ridge 130 can indent the relatively soft metal of the storage container 12 when the fill head is pressed against the end face 154 of the storage container end section 148. As the relatively hard metal ridge 130 is pressed against the relatively soft metal end section 148 of the storage container 12, a continuous annular groove is formed in the end section of the storage container by the seal ridge. The continuous annular groove results because the material of the storage container 12 is plastically deformed by the seal ridge 130. The groove formed by indentation of the end section 148 of the storage container 12 by the seal ridge 130 will have a configuration corresponding to the configuration of the seal ridge.

Figure 4:
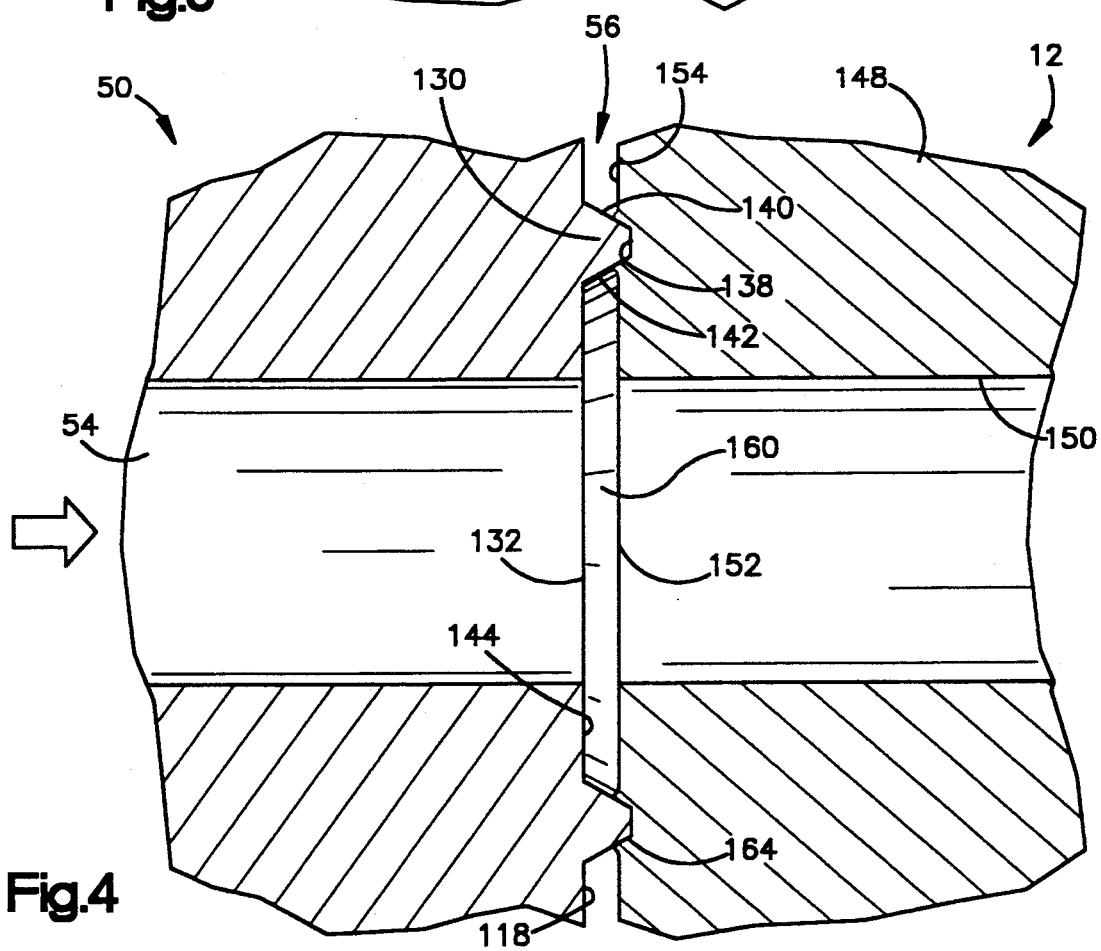
FIG. 4 is an enlarged fragmentary view schematically illustrating a portion of the apparatus of FIG. 1 during operation of the apparatus.

As the seal ridge 130 on the fill head 50 is pressed into the metal of the end section 148 of the storage container 12, a gas tight, metal-to-metal seal is formed to provide a seal Joint 56 (FIG. 4). This metal-to-metal seal joint 56 blocks radially outward flow of gas at a circular space 160 between the portion 144 of the circular end face 118 of the fill head 50 and the circular end face 154 of the end section 148 of the storage container 12. Therefore, there is no leakage of gas through the seal joint 56 during filling of the storage container 12 with gas. The surfaces defining the seal ridge 130 and the surfaces of the container 12 defining the groove in the container formed by the seal ridge 130 thus comprise a seal means providing a gas tight seal between the fill head 50 and the container 12.

In one specific embodiment of the invention, the fill head 50 was formed of 316 stainless steel. In this specific embodiment of the invention, the end section 148 of the storage container 12 was formed of aluminum. The relatively hard stainless steel seal ridge 130 indented the soft aluminum of the end section 148 to form an annular recess 164 around and in a coaxial relationship with the circular inlet 152 in the storage container end section 148. This metal-to-metal seal was capable of sealing gas, including hydrogen gas, so that the leakage of gas through the seal joint 56 during filling of the storage container 12 was no more than $1 \times 10^{-9}$ cubic centimeters per second.

It is desirable that the fill head 50 be formed of a material which is substantially harder than the material of the end section 148 of the storage container 12 in order to prevent wear of the seal ridge 130 when used repeatedly to fill a large number of the storage containers 12. Also, the fill head should be made of a material which, in the preferred embodiment, is not subject to hydrogen embrittlement, and preferably should be a fine grain material. Preferably, the fill head is made of 304 or 316 stainless steel.

When the storage container 12 (FIG. 1) is to be filled with a mixture of the primary gas and the combustible gas, the valves 20, 26 and 40 are actuated to their closed conditions by the controller 30. Thus, the valves 20 and 40 are maintained in the closed condition illustrated in FIG. 1, and the valve 26 is actuated to its closed condition. In addition, the controller 30 actuates the valve 96 to a condition in which the conduit 94 is vented through the valve passage 104 to the vent conduit 100. Thus, the piston chamber 86 is vented to atmosphere so that the piston 78 can be readily retracted, that is, moved leftward from the position shown in FIG. 1.

At this time, the retainer member 72 is withdrawn and, if a filled storage container 12 is in the chamber 68, it is removed from the chamber 68. The next succeeding empty storage container 12 is then positioned in the chamber 68. The end section 148 of the next succeeding empty storage container 12 is placed against the fill head 50. The retainer member 72 is then moved back into alignment with the storage container 12, as shown in FIG. 1.

Once the retainer member 72 has been positioned in alignment with the storage container 12, the controller 30 actuates the valve 96 to the condition shown in FIG. 1. This results in gas being conducted at a relatively high pressure into the piston chamber 86. In one specific embodiment of the invention, nitrogen gas was conducted from a source of nitrogen gas through the valve 96 and conduit 94 into the piston chamber 86 at a pressure of 1,500 psi.

The fluid pressure in the piston chamber 86 presses the piston head 80 toward the right (as viewed in FIG. 1). The fluid pressure force applied against the piston 78 is transmitted to the fill head 50. The fluid pressure force presses the fill head 50 against the end section 148 of the storage container 12. The retainer member 72 abuts the right (as viewed in FIG. 1) end portion of the storage container 12 to hold the storage container against the force applied against the end section 148 by the fill head 50.

The fluid pressure force transmitted from the piston 78 to the fill head 50 presses the seal ridge 130 (FIG. 4) on the fill head against the material around the inlet 152 of the storage container 12. The fluid pressure force transmitted to the fill head 50 is sufficient to cause the relatively hard metal of the seal ridge 30 to indent the relatively soft metal of the end section 148 of the storage container. As this occurs, a gas tight, metal-to-metal seal is formed around the outlet 132 from the passage 54 in the fill head 50 and around the inlet 152 to the passage 150 in the storage container 12.

As a gas tight seal is being established between the storage container 12 and the fill head 50, the controller 30 actuates the valve 40 to an open condition to connect the fill conduit 16 and the conduits 18, 24 and 38 with the vacuum pump. At this time, the valves 20 and 26 are closed. Therefore, operation of the vacuum pump is effective to evacuate the fill conduit 16 and the conduits 18, 24 and 38.

After a gas tight metal-to-metal seal has been obtained between the fill head 50 and the storage container 12 and after the fill conduit 16 has been evacuated, the controller 30 actuates the valve 26 to the open condition shown in FIG. 1. Opening the valve 26 enables flammable gas from a source (not shown) of flammable gas to be conducted through the fill conduit 16 to the storage container 12. The flammable gas may be hydrogen which is conducted from a source of hydrogen at a pressure of about 2,200 to 2,300 psi.

The flammable gas flows from the source through the open valve 26, the fill conduit 16, and the passage 54 in the fill head 50 to the gas tight seal joint 56 between the fill head 50 and storage container 12. The combustible gas flows through the outlet 132 from the passage 54 into the space 160 (FIG. 4) between the fill head 50 and the end section 148 of the storage container 12. Since the seal joint 56 is gas tight, the gas cannot flow radially outward from the space 160. Therefore, the flammable gas flows from the space 160 through the inlet 152 to the passage 150 and into a chamber in the storage container 12.

When the pressure of the flammable gas in the storage container 12 reaches a desired pressure, the controller 30 effects operation of the valve 26 to a closed condition blocking the flow of the flammable gas to the storage container 12. The controller 30 then effects operation of the valve 40 to an open condition to connect the fill conduit 16 with the vacuum pump. At this time, the check valve assembly 58 in the container 12 closes to block any flow of gas from the storage container 12.

The vacuum pump is effective to evacuate the fill conduit 16 and the conduits 18, 24 and 38. The controller 30 then effects operation of the valve 40 back to the closed condition shown in FIG. 1. As this is occurring, the valve 96 is maintained in the open condition shown in FIG. 1. Therefore, the fluid pressure in the chamber 86 is effective to maintain a gas tight, metal-to-metal seal between the fill head 50 and the end section 148 of the storage container 12.

The controller 30 then effects operation of the valve 20 to an open condition. The primary gas can then flow from a source of primary gas through the open valve 20, conduit 18 and the fill conduit 16 to the fill head 50. The primary gas is conducted through the passage 54 in the fill head 50 and past the seal joint 56 into the storage container 12.

Once the storage container 12 has been filled, the controller 30 effects operation of the valve 20 to a closed condition, and operation of the valve 40 to an open condition. This enables the vacuum pump to evacuate the fill conduit 16 and the conduits 18, 24 and 38. As this is occurring, the check valve assembly 58 in the storage container 12 is closed to block a flow of gas from the storage container 12. When the fill conduit 16 and the conduits 18, 24 and 38 have been evacuated, the controller 30 closes the valve 40.

The controller 30 then effects operation of the valve 96 to a condition in which the conduit 94 is connected with the vent conduit 100 through the passage 104 in the valve 96. This results in the fluid pressure in the piston chamber 86 being decreased to atmospheric pressure. The retainer member 72 is then withdrawn and the filled storage container 12 is removed from the holder 62. A next succeeding empty storage container 12 is then positioned in the holder 62, and the cycle is repeated.

During operation of one embodiment of the apparatus 14 to fill the storage container 12, the storage container 12 had a volume of 650 cubic centimeters and was filled with hydrogen gas to a pressure of 300 psi in two seconds. Thus, in this specific instance in which the storage container 12 was filled with hydrogen gas to a pressure of 300 psi in two seconds, the average rate of increase in the fluid pressure in the storage container 12 was 9,000 psi per minute. In this specific instance, the fluid pressure applied against the piston 78 by nitrogen gas in the piston chamber 86 was 1,500 psi. The metal-to-metal seal between the fill head 50 and the end section 148 of the storage container 12 had a leakage of no more than $1 \times 10^{-9}$ cubic centimeters per second.

After the container 12 was filled with hydrogen gas, the valve 20 was connected in fluid communication with a source of primary gas, which was air, at a pressure of about 3,300 psi. The storage container 12 was filled with the primary gas until the pressure in the storage container reached about 2,500 psi. The 2,500 psi pressure of the mixture of gases in the storage container 12 was due to the partial combustible gas pressure of 300 psi and a partial primary gas pressure of 2,200 psi. After the pressure in the storage container 12 reached about 2,500 psi, the controller 30 effected operation of the valve 20 back to the closed condition shown in FIG. 1.

It should be understood that the storage container 12 may be filled with one or more gases other than the previously described mixture of hydrogen and air at pressures other than the previously described pressures. Thus, it is contemplated that the gas tight seal joint 56 can be utilized during the filling of many different types of storage containers with many different types of gases at many different pressures. Also, it should be understood that the containers could be handled by machinery in an automatic processing system and the gas tight seal joint 52 could be incorporated into the system.

From the above description of the invention, those skilled in the art will perceive improvements, changes and modifications. Such improvements, changes and modifications within the skill of the art are intended to be covered by the appended claims.

Having described the invention, the following is claimed:

1. A method of filling a chamber in a container with gas, said method comprising the steps of:
    forming a seal between a fill head and the container by indenting material around an opening in the container with the fill head;
    conducting a flow of gas through the fill head and into the chamber in the container through the opening in the container; and
    blocking gas flow through the seal between the fill head and the container by engagement of the fill head with the indented material of the container around the opening in the container during flow through the fill head.

2. A method as set forth in claim 1 wherein said step of forming a seal between the fill head and the container by indenting material around an opening in the container with the fill head includes plastically deforming the material around the opening in the container with a ridge which extends around an opening in the fill head.

3. A method as set forth in claim 2 wherein said step of conducting a flow of gas through the fill head and into the chamber in the container includes conducting a flow of an oxidizer gas through the fill head and into the chamber in the container and conducting a flow of flammable gas through the fill head and into the chamber in the container.

4. A method as set forth in claim 1 wherein said step of forming a seal between a fill head and the container includes pressing a continuous ridge of material which forms part of the fill head and extends around an opening in the fill head against the container with sufficient force to deform plastically a continuous ring of material of the container around the opening in the container.

5. A method as set forth in claim 4 wherein said step of conducting a flow of gas through the fill head and into the chamber in the container includes conducting a flow of gas through the opening in the fill head and through a space between the fill head and the container which is enclosed by the continuous ridge of material which forms part of the fill head.

6. An apparatus for use in filling a chamber in a container with gas by directing a flow of gas through an opening in the container, said apparatus comprising:
    a fill head;
    passage means for conducting a flow of gas through said fill head, said passage means having an outlet which communicates with the opening in the container during filling of the chamber; and
    seal means for providing a gas tight seal between said fill head and the container, said seal means including a surface connected with said fill head and extending around said outlet for indenting the material of the container around the opening in the container through which a flow of gas is directed during filling of the chamber in the container.

7. An apparatus as set forth in claim 6 further including piston and cylinder means connected with said fill head for pressing said surface against the material of the container under the influence of fluid pressure.

8. An apparatus as set forth in claim 6 wherein said surface is formed of a material having a hardness which is greater than a hardness of the material of the container around the opening in the container to enable said surface to indent 9. An apparatus as set forth in claim 8 further including means for applying force against said fill head to press said surface against the material around the opening in the container.

10. An apparatus as set forth in claim 9 further including means for holding the container against movement during indenting of the material of the container by said surface.

11. An apparatus as set forth in claim 6 wherein said surface is located on an annular ridge connected with said fill head and circumscribing said outlet.

12. An apparatus as set forth in claim 6 wherein said surface is located on a ridge which extends around said outlet, said ridge having a land portion and side portions which slope in opposite directions from said land portion, and the apparatus further includes means for pressing said ridge against the material of the container with said ridge extending around the opening in the container, said land portion and said side portions of said ridge plastically deforming the material of the container as said ridge is pressed against the material of the container.

13. An apparatus as set forth in claim 6 further including gas supply conduit means connected in fluid communication with the passage in said fill head for conducting a flow of an oxidizer gas to the passage in said fill head and for conducting a flow of flammable gas to said passage means.

14. An apparatus as set forth in claim 13 further including additional conduit means for conducting a flow of oxidizer gas and a flow of flammable gas from said gas supply conduit means to enable said gas supply conduit means to be evacuated.

* * * * *

UNITED STATES PATENT AND TRADEMARK OFFICE
CERTIFICATE OF CORRECTION

PATENT NO. : 5,394,908
DATED : March 7, 1995
INVENTOR(S) : James E. Maness

It is certified that error appears in the above-indentified patent and that said Letters Patent is hereby corrected as shown below:

Column 8, line 51, after "indent" insert --the material of the container--.

Signed and Sealed this

Eleventh Day of July, 1995

Attest:

BRUCE LEHMAN

*Attesting Officer*     *Commissioner of Patents and Trademarks*